United States Patent [19]
Rosenbalm

[11] Patent Number: 5,878,940
[45] Date of Patent: *Mar. 9, 1999

[54] METHOD OF FABRICATING SHEET METAL STRUCTURES BY WELDING AND STRUCTURE FORMED THEREBY

[75] Inventor: Allan Wesley Rosenbalm, Blakesburg, Iowa

[73] Assignee: Deere & Company, Moline, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 586,501

[22] Filed: Jan. 16, 1996

[51] Int. Cl.$^6$ .................................................. B23K 31/02
[52] U.S. Cl. ........................... 228/135; 228/184; 228/185
[58] Field of Search .................................. 228/135, 171, 228/184, 185; 29/464, 559; 403/271

[56] References Cited

U.S. PATENT DOCUMENTS

| | | | |
|---|---|---|---|
| 1,484,579 | 2/1924 | Still | 228/171 |
| 2,012,889 | 8/1935 | McIntyre | 228/135 |
| 3,914,062 | 10/1975 | Heininger | 403/272 |
| 4,365,736 | 12/1982 | Stumm | 228/135 |
| 4,550,480 | 11/1985 | Tanikawa et al. | 228/135 |
| 4,993,619 | 2/1991 | Kresse, Jr. et al. | 228/135 |
| 5,190,207 | 3/1993 | Peck et al. | 228/170 |
| 5,244,158 | 9/1993 | Popovich | 228/135 |
| 5,249,818 | 10/1993 | Patterson | 228/135 |

*Primary Examiner*—Samuel M. Heinrich

[57] ABSTRACT

A method of joining sheet metal parts is disclosed which includes forming tabs on one and slots in the other of a pair of parts being welded together with the tabs having a length equal to half the dimensional thickness of the parts. The tabs fit accurately within the slots and welding takes place within the slots at the ends of the tabs so that tabs and material bordering the slots are melted together with the welding rod or wire, whereby the heat generated by the welding process and the resultant weld material are located in the neutral axis of the parts being joined together so that distortion of the parts due to the welding process is lessened or eliminated.

5 Claims, 2 Drawing Sheets

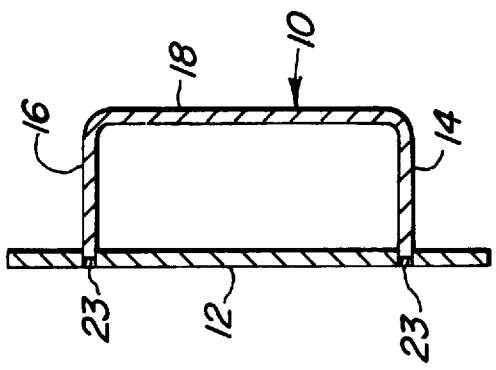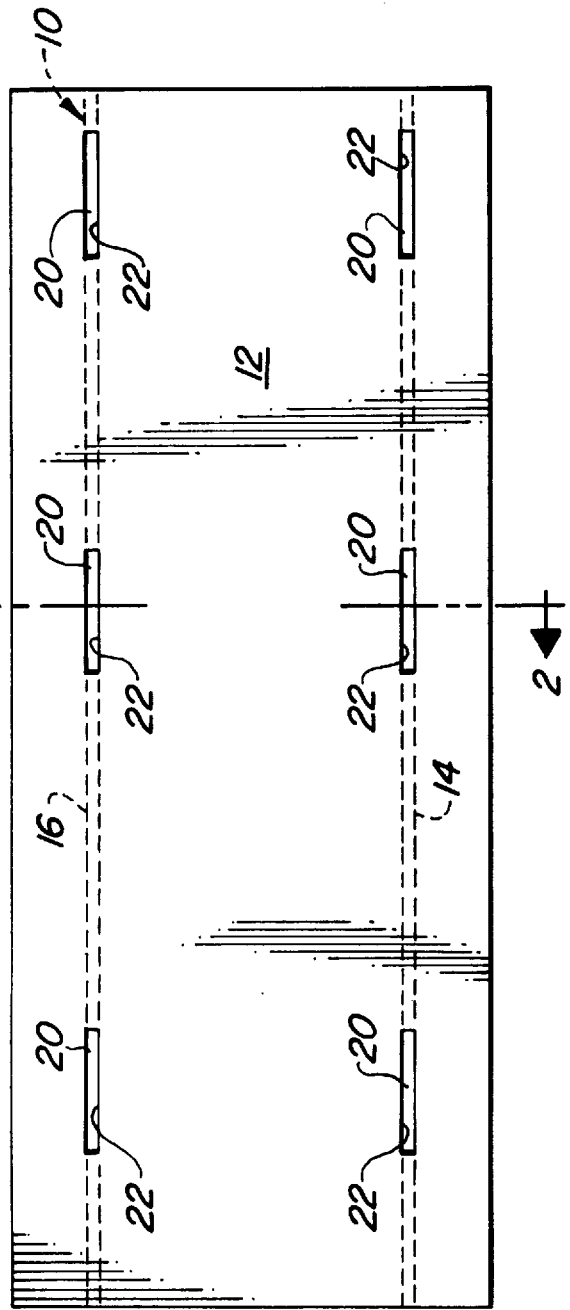

METHOD OF FABRICATING SHEET METAL STRUCTURES BY WELDING AND STRUCTURE FORMED THEREBY

BACKGROUND OF THE INVENTION

The present invention relates to fabricating sheet metal structures and more specifically relates to welding sheet metal parts together to form structures.

The most common way to fabricate sheet metal structures, used on agricultural equipment, for example, is by welding flat sheet metal plates together with the plates being disposed orthogonally to each other, or by forming flat sheet metal plates into angle or channel members and to weld the legs of one or the other of these members to a flat sheet metal plate, with the legs being disposed orthogonally to the plate, to form the desired structures. Positioning of the parts for welding requires tooling to accurately hold them in position. These parts are then welded in place using fillet or butt welds at the intersection of the orthogonally disposed sections of these parts. The welding of these parts is most always done on one side of the parts being welded. This results in the heat of the welding process and the weld material being concentrated on this one side which causes the welded component to distort when the weld cools and shrinks. This distortion then has to be overcome during the assembly of the component into the implement being built.

SUMMARY OF THE INVENTION

According to the present invention there is provided a novel welding method for joining flat sections of first and second sheet metal parts.

An object of the invention is to provide a welding method for joining sheet metal parts in such a way as to avoid distortion of the parts.

Another object of the invention is to provide a welding method for joining flat sections of first and second sheet metal parts which makes the parts self-locating, thus eliminating the need for tooling to accurately position the parts one to the other for being welded.

A more specific object of the invention is to provide a welding method for joining a first sheet metal part flat section to a second sheet metal part that section wherein the flat section of the first part is provided with slots, either in the form of openings or notches, and the second sheet metal part flat section has a straight edge provided with tabs dimensioned for protruding into the slots a distance of one-half the material thickness of the slotted part, whereby welding the ends of the tabs in the slots results in the heat of welding and the weld material being concentrated on the neutral axis, defined by the intersection of the planes occupied by the respective flat sections of the parts, in the vicinity of the weld so as to eliminate, or significantly reduce, part distortion due to the welding operation.

Still another object of the invention is to provide a welding method which is simplified by the fact that all welding may be done from one side without producing hidden welds as heretofore have often been necessary when making large weldments.

These and other objects will become apparent from a reading of the ensuing description together with the appended drawings.

BRIEF DESCRIPTION OF THE DRAWINGS

FIG. 1 is a plan view showing one sheet metal part in the form of a channel positioned for being welded to another sheet metal part in the form of a flat plate, with tabs on the flanges of the channel being received in slots provided in the plate.

FIG. 2 is a vertical sectional view taken along line 2—2 of FIG. 1.

DESCRIPTION OF THE PREFERRED EMBODIMENT

Figure 3:
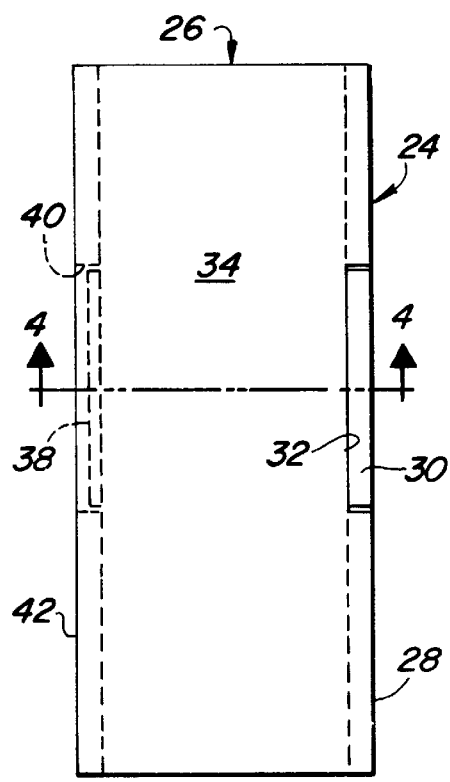
FIG. 3 is a plan view showing one sheet metal part in the form of a first angle member positioned for being welded to another sheet metal part in the form of a second angle member, with tabs at the opposite ends of the first angle member being positioned in slots formed as notches in the opposite ends of the second angle member.

Referring now to FIGS. 1 and 2, there is shown a first sheet metal part in the form of a channel 10 positioned for being welded to a flat, rectangular sheet metal plate 12. Specifically, the channel 10 has opposite flanges 14 and 16 joined by a web 18. A plurality of tabs 20 are formed in evenly spaced relationship one to the other along the length of the channel 10 at the free end of each of the flanges 14 and 16, and each tab 20 is positioned in a rectangular slot 22, here in the form of an opening, located in the plate 12. It is to be noted that each tab 20 is dimensioned so that it fits snugly within and protrudes into an associated slot 22 by a distance of half the thickness of the plate 12. Welding is then performed in the slots 22 at the ends of the tabs 20 so as to fill the slots with weld material 23, shown only in FIG. 2, and join the tabs 20 to the plate 12 at the edges of the slots. When welding is performed in the slots 22 at the ends of the tabs 20 of each of the flanges 14 and 16, it results in the heat generated, and in the weld material 23, being concentrated on the respective neutral axes defined by the intersections of the plate 12 with each of the planes containing the channel flanges 14 and 16 results in the heat generated during the welding process and the weld material 23 being centered on the neutral axis of the plate 12 and on the neutral axis of each of channel flanges 14 and 16. It has been found that this manner of welding has eliminated the distortion of parts often occurring with known methods of welding and that the weld joint thus created is stronger than a fillet weld, which is the most common weld type used for joining structural parts.

The thickness of sheet metal material with which the welding method of the present invention is particularly effective is from 3 mm. to 8 mm. Accurate location of the notches and tabs is preferably done by laser-cutting the parts since this type of cutting is the only practical way to make the relatively short tabs. Because of the accuracy of the placement of the tabs and slots, no special tooling is required for fixing the parts for being welded.

Now some other shapes of parts that can be welded will be described, with it to be understood that the range of thicknesses of these parts for successful welding is between 3 mm. and 8 mm.

Figure 4:
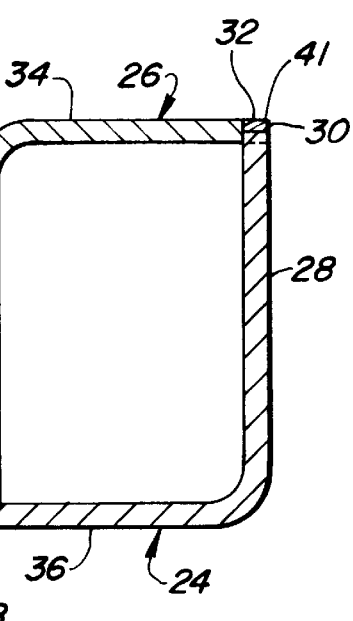
FIG. 4 is a vertical sectional view taken along line 4—4 of FIG. 3.

Specifically, referring now to FIGS. 3 and 4, there is shown first and second sheet metal parts, respectively, formed into first and second L-shaped or angle members 24 and 26. The first L-shaped member 24 has a long leg 28 having a free end provided with a tab 30 inserted in a slot 32, formed as a notch, in a short leg 34 of the second L-shaped member 26, and has a short leg 36 having a free end provided with a tab 38 inserted in a slot 40, also formed as a notch, provided in a long leg 42 of the second L-shaped member 26. For the sake of simplicity, only one set of tab-to-slot connections is shown at each joint with it to be understood that the members 24 and 26 could be made of any desired length requiring additional sets of tab-to-slot connections. In any event, a tube having a rectangular cross section is formed by the formed sheet metal members 24 and 26 when the joints formed by the tab 30 and slot 32, and formed by the tab 38 and slot 40 are welded together with weld material 41, shown only in FIG. 4, deposited within the slots 32 and 40 respectively at the ends of the tabs 30 and 38. It has been found that the resultant welded joints, just described, are as effective as those that result when the tabs are received in slots that are in the form of openings.

Figure 5:
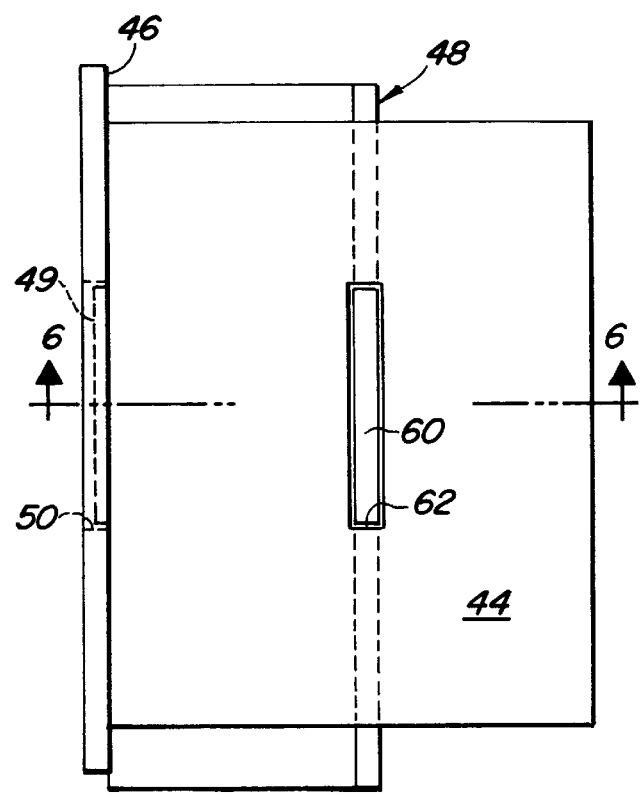
FIG. 5 is a plan view showing one sheet metal part, in the form of an angle member, and two other sheet metal parts respectively in the form of first and second flat plates positioned for being welded to each other to form a structure including a tubular section, the angle member having tabs at free ends of its legs located in slots, in the form of openings, respectively provided in the first and second flat plates, with the plates being disposed perpendicular to one another with a tab at the end of the first plate being received in a slot provided in the second plate.
Figure 6:
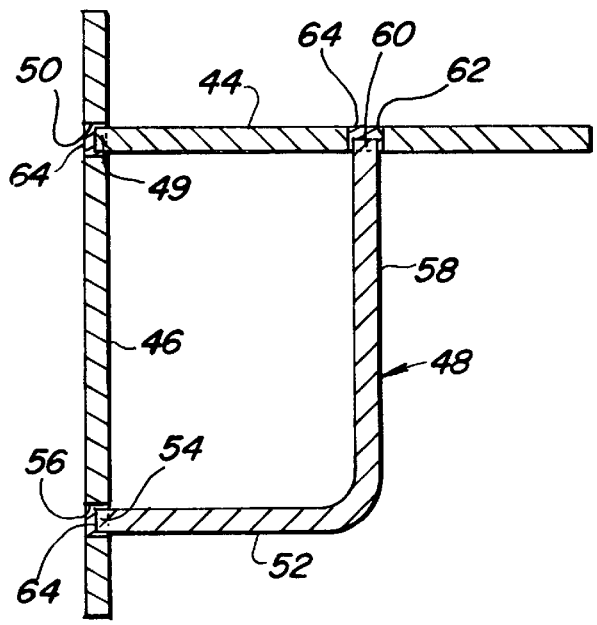
FIG. 6 is a vertical sectional view taken along line 6—6 of FIG. 5.

Referring now to FIGS. 5 and 6, there is shown a relatively complex assembly including first and second flat sheet metal plates 44 and 46, respectively, and an angle or L-shaped member 48. The plates 44 and 46 are disposed perpendicular to each other with the first plate 44 having a tab 49 received in a slot 50 provided in the second plate 46. The L-shaped member 48 has a short leg 52 provided at its end with a tab 54 received in a slot 56 provided in the second plate 46. The L-shaped member 48 has a long leg 58 provided at its end with a tab 60 received in a slot 62 provided in the first plate 44. Thus, the structure formed defines a tubular portion of rectangular cross section and a T-joint joined together with weld material 64, shown only in FIG. 6, deposited in the slots 50, 56 and 62 respectively at the ends of the tabs 48, 54 and 60.

The various weldments disclosed are merely representative of those which can be made using the present invention to advantage. No matter what shape of weldment is formed, all of the welded joints have the aspect of the heat generating the weld material forming the weld being along the neutral axis defined by the intersection of each orthogonally disposed set of planes containing flat plates or flanges or legs forming flat sections of parts being used in making the weldment.

I claim:

1. In a welding method for joining a flat section of a first sheet metal part of a first thickness to a flat section of a second sheet metal part, comprising:
   a) forming at least one rectangular slot in a first flat surface of said first flat section of said first sheet metal part;
   b) forming at least one tab, shaped complementary to said at least one rectangular slot, on a planar first edge of said flat section of said second sheet metal part with said tab having a length equal to one-half said thickness of said flat section of said first sheet metal part;
   c) assembling said tab of said second sheet metal part into the slot of said first sheet metal part, with said flat section of said first sheet metal part and said flat section of said second sheet metal part being disposed orthogonally to one another; and
   d) welding said tab of said second sheet metal part to said first sheet metal part at said slot, including filling said slot with weld material.

2. The welding method defined in claim 1 wherein:
   step a) includes the step of forming a plurality of rectangular slots at preselected intervals in lengthwise alignment with each other in said first flat surface of said flat section of said first sheet metal part,
   step b) includes the step of forming a plurality of tabs at said preselected intervals in lengthwise alignment with each other along said planar first edge of said flat section of said second sheet metal part,
   step c) includes the step of assembling the plurality of tabs of said flat section of said second sheet metal part respectively into said slots of said flat section of said first sheet metal part, and
   step d) includes the step of welding each of said tabs to said first flat section of said first sheet metal part respectively at said plurality of slots.

3. A method of making a tubular weldment from a first sheet metal part formed into a channel and a second sheet metal part in the form of a rectangular sheet, comprising:
   a) forming a plurality of rectangular tabs at equally spaced locations along respective edges of first and second flanges of said channel, with each tab having a length equal to one-half a thickness dimension of said flat rectangular sheet;
   b) forming a plurality of rectangular slots in parallel rows in said flat rectangular sheet spaced from each other a distance equal to the distance between said flanges of said channel, with the slots of each row being spaced from each other a distance equal to the distance between said tabs on each of said flanges;
   c) assembling the parts for welding with the tabs of said channel being respectively received in slots of said flat rectangular sheet; and
   d) welding said tabs in place in said slots by welding at respective ends of said tabs including filling said slots with weld material, such that welding heat and weld material respectively joining said tabs of a first one of said flanges with the flat rectangular sheet are concentrated in a first neutral axis defined by the intersection of the plane of said flat rectangular sheet with the plane of said first one of said flanges, and such that welding heat and weld material respectively joining said tabs of a second one of said flanges are concentrated in a second neutral axis defined by the intersection of the plane of said flat rectangular sheet with the plane of said second one of said flanges.

4. A method of making a tubular weldment from first and second, identically dimensioned, L-shaped angle members, with each angle member including a short and a long leg, comprising:
   a) forming at least one rectangular notch in respective free ends of said short and long legs of said first L-shaped angle member;
   b) forming at least one rectangular tab on respective ends of said short and long legs of said second L-shaped angle member with each tab being dimensioned for fitting snugly within a respective one of said rectangular notches and having a length equal to half the thickness of sheet metal material from which said angle members are formed;
   c) assembling the first and second angle members together with said at least one tab at the free end of said short leg of said second angle member being received in said at least one notch at the free end of said long leg of said first angle member, and with said tab at the free end of said long leg of said second angle member being received in said notch at the free end of said short leg of said first angle member;

d) welding said tabs in place in said notches, including filling said notches with weld material [by melting said tabs and material bordering said slots] whereby heat generated and weld material deposited during welding said at least one tab of said short leg of said second angle member in said at least one notch in the long leg of said first angle member will be concentrated in a neutral axis defined by the intersection of respective planes of said short leg of said second angle member and the long leg of said first angle member, and whereby heat generated and weld material deposited during welding said at least one tab of said long leg of said second angle member in said at least one notch in the short leg of said first angle member will be concentrated in a neutral axis defined by the intersection of respective planes of said long leg of said second angle member and of said short leg of said first angle member.

5. A method of forming a sheet metal weldment including first and second flat plates and an angle member, all of an equal thickness, comprising:

a) forming at least one rectangular slot in, and at least one rectangular tab along a straight edge of, said first flat plate with said slot and tab being arranged in spaced parallel relationship to each other and with said tab having a length equal to one-half said thickness;

b) forming a first rectangular slot along a first imaginary line in said second flat plate and forming a second rectangular slot along a second imaginary line located in spaced parallel relationship to said first imaginary line;

c) forming at least one rectangular tab at each of respective free ends of first and second legs of said angle member with the tabs each having a length equal to one-half said thickness;

d) assembling said first and second flat plates and angle member such that:

i) said first and second flat plates are disposed orthogonally to each other and respectively disposed orthogonally to said first and second legs of said angle member with said at least one tab of said first flat plate inserted in said first slot of said second plate;

ii) said at least one tab at the free end of the first leg of said angle member is inserted in said at least one slot located in said first plate; and iii) said at least one tab at the free end of the second leg of said angle member is inserted in said second slot of said second plate; and e) welding an end of said at least one tab of said first plate in place in the associated slot of said second plate including filling said associated slot of said second plate with weld material, and welding respective ends of said at least one tabs, respectively at the free ends of said first and second legs of said angle member, in place in the associated slots respectively provided in the first and second flat plates including filling said associated slots with weld material.

* * * * *